J. W. REIGEL.
TORQUE ARM FOR AUTOMOBILES.
APPLICATION FILED JULY 6, 1916.
1,239,521.
Patented Sept. 11, 1917.
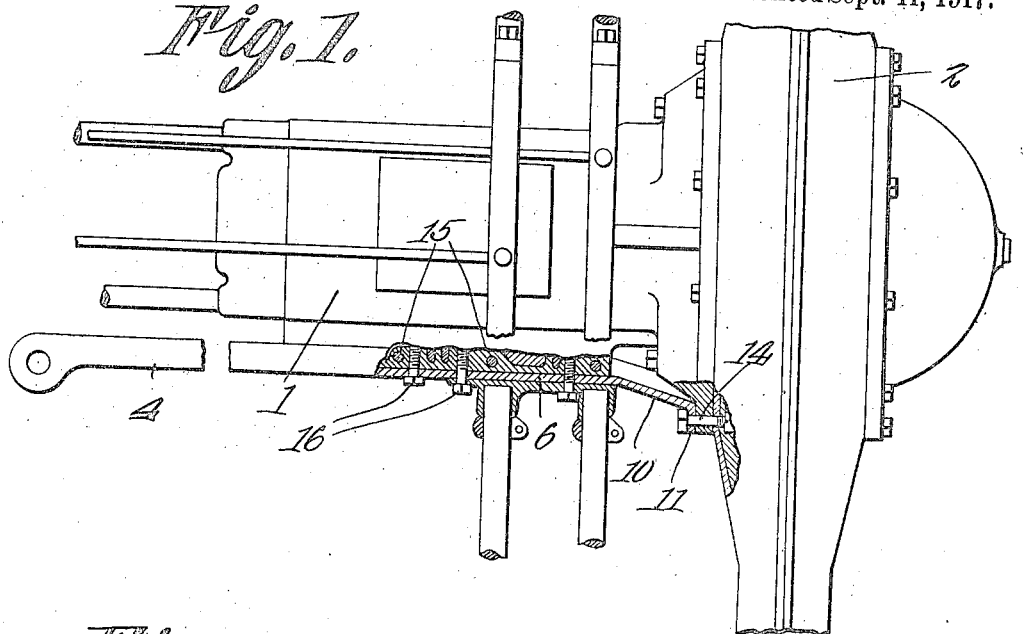
Fig. 1.
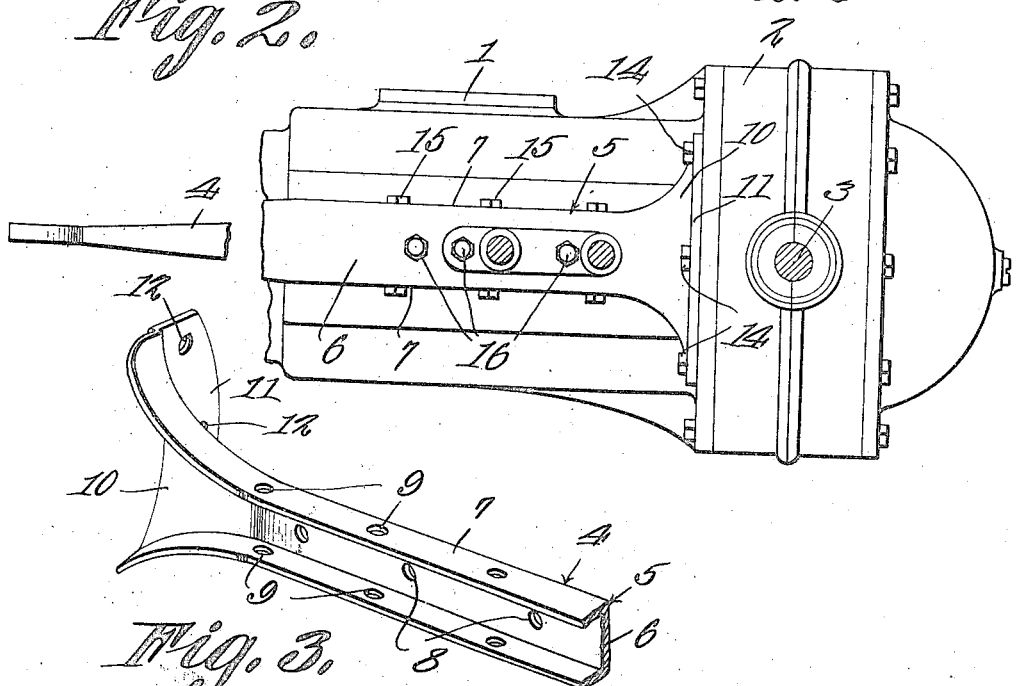
Fig. 2.
Fig. 3.
Witnesses
J. W. Reigel
Inventor,
by
Attorneys.

UNITED STATES PATENT OFFICE.

JOHN W. REIGEL, OF BRADFORD, PENNSYLVANIA.

TORQUE-ARM FOR AUTOMOBILES.

1,239,521.

Specification of Letters Patent.

Patented Sept. 11, 1917.

Application filed July 6, 1916. Serial No. 107,815.

*To all whom it may concern:*

Be it known that I, JOHN W. REIGEL, a citizen of the United States, residing at Bradford, in the county of McKean and State of Pennsylvania, have invented a new and useful Torque-Arm for Automobiles, of which the following is a specification.

The device forming the subject matter of this application is an improved torque arm for motor propelled vehicles.

By way of explanation it may be stated that the common practice hitherto has been to assemble the forward end of the torque arm with some accessible portion of the frame of the vehicle, and to connect the rear end of the torque arm to the transmission casing. This practice has been fraught with disadvantage, for the following reason. Since the differential casing and the rear axle lie to the rear of the transmission casing, it is obvious that should lost motion or looseness occur between the rear end of the torque arm and the transmission casing, this lost motion or looseness will be magnified so far as the differential casing and the rear axle are concerned. By way of illustration and as the result of observations, it may be stated that if there is a lost motion of one-thirty-second of an inch between the rear end of the torque arm and the transmission casing, this lost motion will be magnified to one inch, so far as the rear axle and the differential casing are concerned.

The present invention aims to improve structures of the type hereinbefore mentioned and to obviate the undesirable consequences above enumerated, by connecting the rear end of the torque arm to the transmission casing, and by extending the rear end of the torque arm beyond the transmission casing, so that it may be connected directly to the differential casing, at a point relatively close to the rear axle of the vehicle.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1 shows in top plan, a portion of an automobile whereunto the structure forming the subject matter of this application has been applied, parts appearing in section;

Fig. 2 is an elevation of the structure shown in Fig. 1;

Fig. 3 is a perspective showing the rear end of the torque arm.

In the accompanying drawings, the numeral 1 indicates a transmission casing constituting a part of a motor propelled vehicle, the differential casing appearing at 2 and the rear axle being shown at 3. The torque arm is shown at 4, the forward end thereof being adapted for connection with the vehicle frame in the common and well known manner.

In carrying out the present invention, the rear end of the torque arm 4 is fashioned into a trough-shaped neck 5, comprising a body 6 and flanges 7, the body 6 having any desired number of openings 8, and the flanges 7 being provided with any suitable number of openings 9. The flanges 7 and the body 6 merge into an enlarged head which is denoted generally by the numeral 10, the head 10 having a laterally projecting lip 11. By means of vertically disposed securing devices 15, passing through the openings 9 in the flanges 7, the neck 6 of the torque arm is assembled with the transmission casing 1. Securing devices 16 which are horizontally disposed, pass through the openings 8 in the body 6 of the neck 5 and constitute an additional means for connecting the neck or rear end of the arm with the transmission casing 1. The lateral lip 11 which constitutes a part of the head 10 abuts against one of the constituent members of the differential casing 2, and through openings 12 in the lip 11 pass securing devices 14 which constitute a means for holding together the constituent members of the differential casing 2.

From the foregoing it will be observed that the torque arm forming the subject matter of this application is so constructed that it is securely connected not only with the transmission casing 1, but with the differential casing 2 as well. The torque arm, therefore, will be found to be peculiarly efficient for the ends in view.

Having thus described the invention, what is claimed is:—

1. In an automobile, a differential casing; a transmission casing; a torque arm provided at its rear end with a lateral flange abutting against the differential casing; a removable securing element passing through the flange and entering the differential casing; and means for securing the torque arm to the transmission casing.

2. In an automobile, a transmission casing; a differential casing; a torque arm provided at its rear end with a trough-shaped neck merging into an enlarged head provided with a lateral lip, the neck coacting with the transmission casing, and the lip abutting against the differential casing; means for securing the lip to the differential casing; and means for securing the neck to the transmission casing.

In testimony that I claim the foregoing as my own, I have hereto affixed my signature in the presence of two witnesses.

JOHN W. REIGEL.

Witnesses:
A. GILLIS,
A. J. COVINE.